GUNN & CHRISTIAN.
Railroad Safety-Car.
No. 77,456.  Patented May 5, 1868.
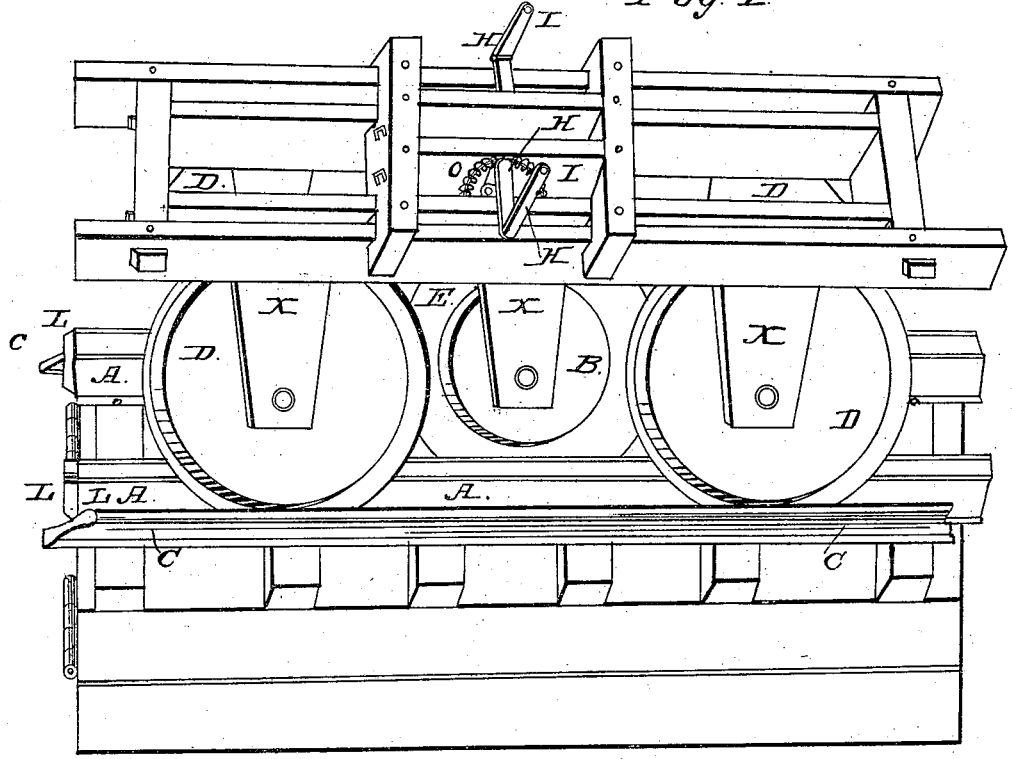
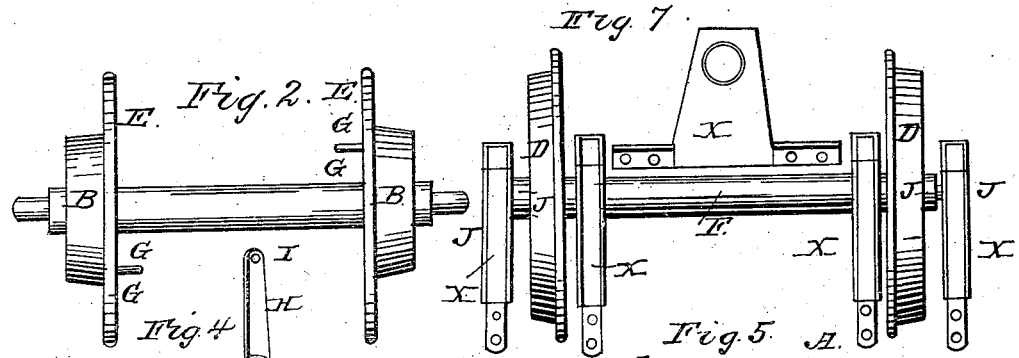

UNITED STATES PATENT OFFICE.

JOHN B. CHRISTIAN, OF MOUNT CARROLL, AND JOHN GUNN, OF SALEM TOWNSHIP, CARROLL COUNTY, ILLINOIS.

IMPROVEMENT IN RAILROADS.

Specification forming part of Letters Patent No. 77,456, dated May 5, 1868.

*To all whom it may concern:*

Be it known that we, JOHN B. CHRISTIAN, of Mount Carroll, in the county of Carroll, in the State of Illinois, and JOHN GUNN, of Salem township, in the county of Carroll, in the State of Illinois, have invented an improvement in railroad cars and track to prevent cars from running off the track; and we do hereby declare that the following is a full and exact description of the same, reference being had to the accompanying drawings, and to the letters of reference marked thereon.

The nature of our invention consists in providing a railroad-track with hollow rolled-iron rails or their equivalent, laid inside of the usual T-rail, and providing cars with two or more pairs of wheels having broad flanges to hang immediately above the inside hollow rails without touching the same only in case of accidents; and, also, extending frames and journal-boxes inside of the wheels D D, yet not touching the axles except in case of accidents, which axles then would act as journals at that point and prevent accidents.

To enable others skilled in the art to make and use our invention, we will proceed to describe its construction and operation.

We provide railroad-tracks with hollow rolled-iron rails A A, placed inside of the usual T-rail, c c, Figure 1, but not so near that it will come in contact with the outer wheels, unless the flange of the wheels D D, Fig. 1, run on the T-rail, as in case of accident. The hollow rails A A can be spiked on the cross-ties of the railroads now in use. An end view of this rail is shown at Fig. 6. The lower portion is somewhat narrower than the top to prevent friction, though any other good rail can be used as an equivalent if placed in the same position on the track. The rail A A can be made from five to eight inches high and from three to five inches wide at the top, and of any thickness and strength desired. As these rails are not used only in case of accident, there will not be much wear and tear on them or the wheels B B, Figs. 1 and 2, intended to run on them. These rails are connected together by a projecting portion from the inside of one rail and inserted into the inside of the other rail, as shown at L L, Figs. 1 and 5.

The wheels B B, Fig. 2, we place near the center of the truck at each end of a car having a shorter axle than the wheels D D, Fig. 3, so that they will hang about one inch above the inside rails A A, and the flanges E E of the wheels B B, Fig. 2, are placed about one inch from the inside of the rails A A.

We attach to the truck-frame a double or bent lever, (H H, shown at Figs. 1 and 4,) having an opening, I I, at the upper end of it, to receive and attach a cord to it to connect it with the alarm-bell in the car. This lever H H is kept in position by two spiral springs, O O, one on each side of it, so that it will operate on the bell if the car is run with either end forward. The spiral springs O O are placed in the periphery of a circle to work easily. The upper end of the lever H H can be placed on the inside or outside of a car by being protected by a cover. As the wheels B B are placed above the rails A A, the alarm will not be given unless an accident happens, so that the side of the truck will be lowered one inch. Then the alarm-bell will be rung violently by the pins G G on the wheels B B, striking the lower end of the lever H H.

We hang our wheels, in the usual manner, with Babbitt-metal journal-boxes or their equivalent. On the inside of the wheels D D, on the axle F, Fig. 3, we place a frame and journal-box, X, similar to those at X, Fig. 1, having an opening about one-fourth (¼) inch larger than the diameter of the axle, so as not to touch the axle except in case of the breaking of one or both the journals. Then the axle would be kept in position by the frame and journal-box, the same as by the journals J J, Fig. 3.

If one or more of the T-rails become broken or detached from the cross-ties and removed entirely from the track, the car with this improvement would still run along on the inside rail as though no accident had happened. The weight of one car only will probably be on the inside rail at one time. Therefore the inside rails can be used comparatively light, as the weight of the whole train will probably never bear on them, as but one car at a time would be likely to get damaged or unfit to run on the T-rail.

What we claim as our invention, and desire to secure by Letters Patent, is—

1. The construction and arrangement of a railroad-track composed of the hollow rolled-iron rails A A, placed inside of the usual T-rails, substantially as and for purposes set forth.

2. The construction and arrangement of railroad-cars having two or more pairs of broad-flanged wheels, B B, substantially as and for the purposes specified.

3. The lever H H, in combination with the spiral springs O O, moving in the periphery of a circle, for the purpose substantially as set forth.

JOHN B. CHRISTIAN.
JOHN GUNN.

Witnesses:
NELSON FLETCHER,
L. M. HEALY.